June 16, 1925.

T. MIDGLEY

TIRE MOLD

Filed March 3, 1923

1,542,799

INVENTOR
Thomas Midgley
BY Edward C. Taylor
ATTORNEY

Patented June 16, 1925.

1,542,799

UNITED STATES PATENT OFFICE.

THOMAS MIDGLEY, OF HAMPDEN, MASSACHUSETTS, ASSIGNOR TO THE FISK RUBBER COMPANY, OF CHICOPEE FALLS, MASSACHUSETTS, A CORPORATION OF MASSACHUSETTS.

TIRE MOLD.

Application filed March 3, 1923. Serial No. 622,491.

*To all whom it may concern:*

Be it known that I, THOMAS MIDGLEY, a citizen of the United States of America, residing at Hampden, in the county of Hampden and State of Massachusetts, have invented certain new and useful Improvements in Tire Molds, of which the following is a specification.

The present invention relates to improvements in molds adapted for vulcanizing rubber articles such, for example, as tire casings, and is particularly directed to the improvement of such molds in economy of operation, low cost, and lightness. It finds particular utility with molds intended to be used under internal fluid pressure.

Figure 1:
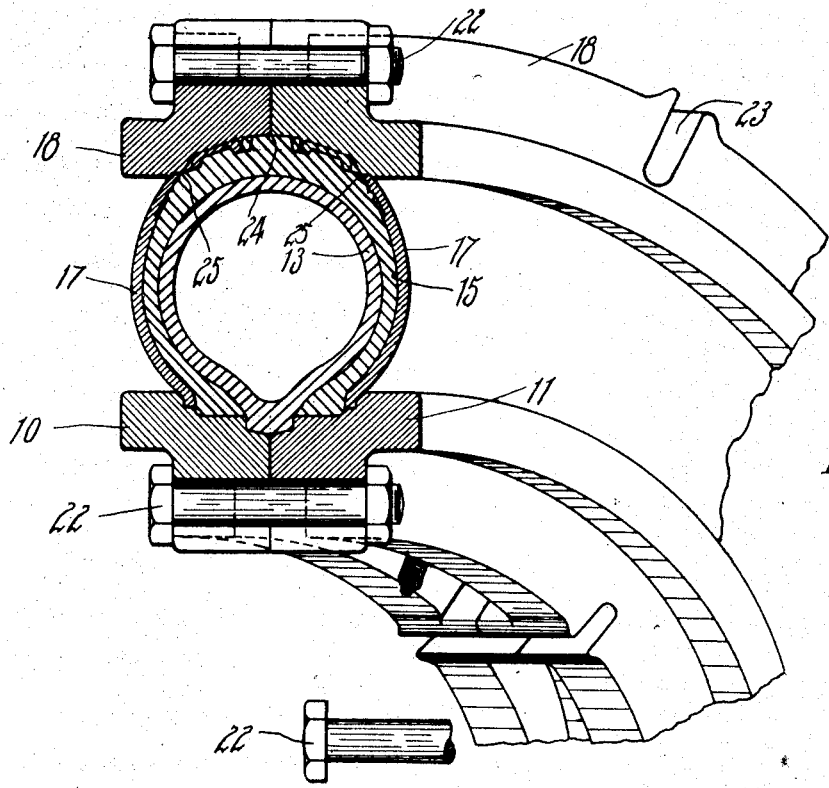
Figure 2:
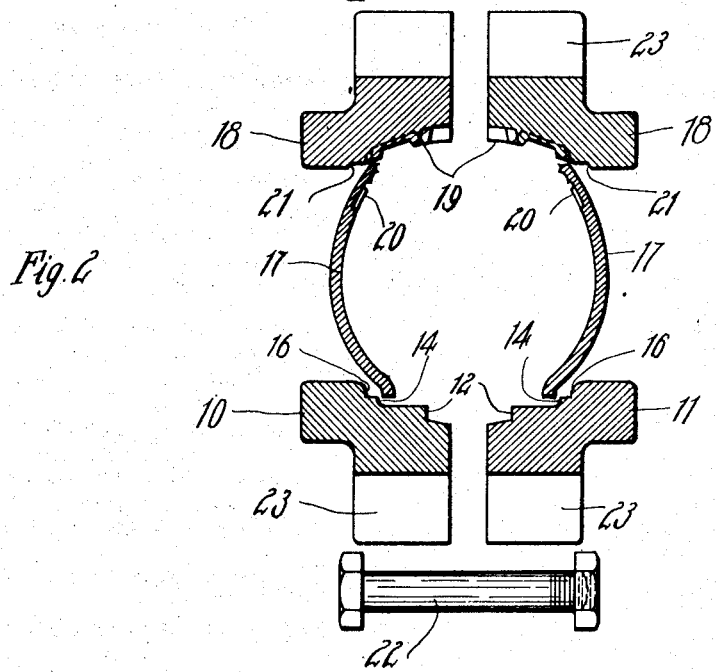

The invention will now be described in connection with the accompanying drawings, in which Fig. 1 is a sectional view showing a portion of the complete circumference of the mold; and Fig. 2 is a sectional view showing the parts separated.

In copending applications filed February 26, 1923, March 2, 1923, and March 5, 1923, and bearing Serial Numbers 621,425, 622,264, and 622,764, respectively I have illustrated a mold which may be constructed wholly of steel stampings or forgings. While the present mold may be constructed of similar material, it is designed particularly to cover cases in which it is desired to make the tread forming portion of the mold out of cast iron or steel or rather heavier steel forgings, while retaining the lighter sheet metal construction of the side plates. The present mold is also particularly useful in cases where, by the nature of the tread pattern in depth, angularity, or some other feature, it would be difficult to remove the tire from the mold if a unit tread ring were used.

The mold in the illustrated embodiment is formed of six parts, instead of four as in the mold shown in said copending application, since the base ring and tread ring are each circumferentially split into two sections. The two sections 10 and 11 of the base ring are formed rather similar to the bead clamping rings now used in the vulcanization of cord tires, except that in addition to the shoulder 12 on each ring which serves to position the inflatable annular bag 13, and the shoulder 14 which serves to position the bead portion of the tire 15, a shoulder 16 is provided. Against these shoulders, and between them and the tire, lie the annular side plates 17 suitably curved to impart the desired molded shape to the sides of the tire.

The tread ring sections 18 are fitted to mate closely together, and are engraved or otherwise suitably formed at 19 on their inner peripheries into the reverse of the desired tread pattern. This pattern may be continued at 20 on the side plates. Shoulders 21 on the tread ring sections form seats against which the side plates fit, so that when the tread and base ring sections are assembled the side plates will be firmly clamped in position. The sections of the tread and base rings are held together as by bolts 22 passing through mating slots 23 in the members. Dowel pins may also be provided to insure axial registration in the known manner.

This type of mold has many advantages over the usual cast iron or steel molds, some of which have been pointed out above. It will be noted from the construction described that there are three lines at the tread where overflow of excess rubber may take place—between the sections of the tread ring at 24, and between the tread ring and the side plates at 25. It is recognized in the art that in order to insure a fully molded tire it is necessary to build it with a slight excess of rubber which is extruded from the mold during vulcanization. The provision of three spaced circumferential extrusion lines in the present case as contrasted with the single line of the usual two-part mold causes a great decrease in the flow of the rubber, with a consequent decrease in the defects caused thereby such as buckles or waves in the fabric. The mold is much lighter than molds generally used at present in manufacturing operations, resulting in greater ease in handling and a lessening of the heat required to warm the metal of the mold to vulcanization temperature, all of which is wasted. The tread and bead rings have their side surfaces substantially parallel to the plane of the mold, and lying slightly beyond the curved sidewalls. If it is desired to stack these molds or to exert lateral mold-closing pressure on these surfaces by the usual vulcanizing or mold-closing press, it can be done without danger to the sidewalls, which are protected by their position within the bearing surfaces.

Having thus described my invention, I claim:

1. A mold adapted for vulcanizing tire casings, comprising a circumferentially split base ring having shoulders adapted to receive the bead portions of a tire casing and the base of an annular inflatable bag, a circumferentially split tread ring, means for holding the sections of the base ring and of the tread ring in assembled relation, sheet metal side plates adapted to form together with the base and tread rings an enclosed space for the reception of a tire casing, and shoulders on the base and tread rings adapted to receive the side plates.

2. A tire mold comprising a circumferentially split tread ring forming the outer periphery of the assembled mold, a circumferentially split base ring forming the inner periphery of the assembled mold, side plates bridging the gap between the tread and base rings, and means for holding the several parts in assembled relation.

3. A mold for vulcanizing the outer casings of pneumatic tires, having sheet metal side portions and inner and outer peripheral portions of heavier construction than the sides, said peripheral portions extending beyond the side portions in a lateral direction and affording bearing surfaces against which lateral pressure may be exerted without injury to the side plates.

4. A mold adapted for the vulcanization of the outer casings of pneumatic tires comprising inner and outer peripheral portions, the former having bead molding and the latter tread molding surfaces, and side portions formed of sheet metal distortable under directly applied lateral pressure, the side portions being curved to conform to the tire, bridged between the peripheral portions, and separated from each other by the peripheral portions, the peripheral portions of the mold being of heavier construction than the side portions and being adapted to receive and withstand a lateral mold-closing pressure without subjecting the bridged sheet metal side portions thereto.

5. A mold adapted for the vulcanization of the outer casings of pneumatic tires, comprising side wall portions curved to conform to the tire and formed of sheet metal distortable under directly applied lateral pressure, an outer peripheral portion having a tread molding surface and constructed to receive and withstand a lateral mold closing pressure while leaving the distortable side wall portions free from such pressure, and an inner peripheral portion closing the mold to form a tire molding cavity.

6. A mold adapted for the vulcanization of the outer casings of pneumatic tires, comprising side wall portions curved to conform to the tire and formed of sheet metal distortable under directly applied lateral pressure, an outer peripheral portion having a tread molding surface and constructed to receive and withstand a lateral mold closing pressure while leaving the distortable side wall portions free from such pressure, and an inner peripheral portion closing the mold to form a tire molding cavity and also constructed to receive and withstand a lateral mold closing pressure while leaving the distortable side wall portions free from such pressure.

7. A mold adapted for the vulcanization of the outer casings of pneumatic tires, comprising side wall portions curved to conform to the tire and formed of sheet metal distortable under directly applied lateral pressure, an outer peripheral portion having a tread molding surface, and an inner peripheral portion closing the mold to form a tire molding cavity, and constructed to receive and withstand a lateral mold closing pressure while leaving the distortable side wall portions free from such pressure.

8. A mold for the outer casings of pneumatic tires comprising inner bead molding and outer tread molding annular portions arranged in substantially parallel relation over the width of the tread and base portions of a tire and formed to withstand great pressure acting from opposite sides of the mold, side wall portions of sheet metal bridged between the inner and outer portions and formed to withstand great pressure acting as a tire expanding force against said portions, said annular portions having surfaces on opposite sides of the mold parallel to and spaced apart from the central plane of the mold so as to be substantially tangent to the side wall portions, all constructed and aranged so that all the mold closing pressure may be applied against said surfaces and the side wall portions may be substantially free of all forces except the internal expanding force acting to press the tire outwardly.

THOMAS MIDGLEY.